United States Patent [19]

Miki

[11] 4,210,563
[45] Jul. 1, 1980

[54] SAND MOLD COMPOSITIONS CONTAINING SCENTED WOOD

[76] Inventor: Masamitsu Miki, No. 25-15, 1-chome, Nakahara, Mitaka-shi, Tokyo, Japan

[21] Appl. No.: 946,954

[22] Filed: Sep. 29, 1978

[30] Foreign Application Priority Data

Oct. 4, 1977 [JP] Japan ............................. 52-118575

[51] Int. Cl.$^2$ ............................. C08L 1/00; B22C 1/22
[52] U.S. Cl. ............................. 260/17.2; 164/43
[58] Field of Search ............................. 164/43; 260/DIG. 40, 260/17.2; 106/38.6

[56] References Cited

FOREIGN PATENT DOCUMENTS

| 49832 | 6/1974 | Australia | 164/43 |
| 51-4178 | 2/1976 | Japan | 164/43 |
| 51-31762 | 9/1976 | Japan | 164/43 |

*Primary Examiner*—Robert D. Baldwin
*Assistant Examiner*—J. Reed Batten, Jr.
*Attorney, Agent, or Firm*—Wenderoth, Lind & Ponack

[57] ABSTRACT

Metallurgical formed articles, such as a metal casting mold or hot top sleeve, which emit fragrance when heated and formed from refractory material containing powder or granular vegetable substance which emits fragrance when heated, and method of producing the same.

5 Claims, No Drawings

SAND MOLD COMPOSITIONS CONTAINING SCENTED WOOD

BACKGROUND OF THE INVENTION

1. Field of the Invention

The present invention relates to metallurgical formed articles such as molds and hot top sleeves for metal casting, and more particularly metallurgical formed articles, such as metal casting molds and hot top sleeves, which are formed using an organic binder.

As the molds which are formed with use of an organic binder, organic self-curing molds, such as furan molds, Linocure molds (trademark by Ashland Chemical Co.) and iso-cure molds, and shell molds have conventionally been known.

The organic self-curing molds, as compared with inorganic self-curing molds, have very low residual strength, hence show very excellent shake-off when they are shaken on a shaker after the casting and found rapidly expanding applications. Meanwhile, shell molds also have had a remarkable increase in their application in the field of light metal castings or steel castings in addition to cast iron.

However, for production of these molds, an organic binder, such as furan resin, phenol resin and oil-modified alkyd resin, is employed. Therefore, during the production of these molds and/or during the casting operation, the organic binder is burnt or thermally decomposed to emit bad and very offensive odors, severely deteriarating the working conditions.

SUMMARY OF THE INVENTION

Therefore, one of the objects of the present invention is to eliminate the disadvantage of the conventional metallurgical formed articles such as molds and hot top sleeves which employ an organic binder for their forming.

Another object of the present invention is to provide a metallurgical formed article, such as molds and hot top sleeves, which emit fragrance when heated during molding and/or casting operations.

Further another object of the present invention is to provide a method for producing such metallurgical formed articles.

For achieving the above objects, the present invention is characterized in that powder or granular vegetable substances which emit fragrance when heated, such as scented wood meal, for example aloes-wood ar sandal-wood are admixed with the refractory material such as sand and organic binder of which the molds or hot top sleeves are formed.

DETAILED DESCRIPTION OF THE INVENTION

According to the present invention, powder or granular vegetable substance which emits fragrance when heated is admixed to the forming material comprising for example sand and an organic binder, such as furan resin or phenol resin, and then the mixture is formed into a mold or a hot top sleeve. When the mold or hot top sleeve is used for metal casting, the bad and very offensive smell of the organic binder is destroyed by the fragrance emitted from the fragrant vegetable substance.

DESCRIPTION OF THE PREFERRED EMBODIMENT

The present invention will be more clearly understood from the following embodiments.

For production of a furan mold, a mixture of 100 parts by weight of sand, 3 parts by weight of furan resin, curing agent (30% by weight on the basis of the furan resin), and 0.1 part by weight of aloes-wood powder is formed according to a conventional method.

When molten metal is poured into the mold thus obtained, the aloes-wood powder in the mold is smoked and steamed by the heat transferred from the molten metal through the mold wall, and emits fragrance to destroy the bad smell generated by the thermal decomposition of the furan resin.

The amount of the fragrant vegetable substance to be added to the forming material varies depending on the type and nature of the organic binder used, but normally 0.5 to 5.0% by weight on the bais of the organic binder is sufficient.

For production of a shell mold also, powder or granules of the fragrant vegetable substance may be admixed with a mixture of phenol resin, curing agent and sand, or admixed with phenol resin coated sand, for example. Also the substance may be incroporated into the resin coated sand during its production. The bad smell generated by the thermal decomposition of the phenol resin during the molding and/or casting operation can be destroyed by the fragrance from the fragrant substance. Hence, the malodaraus conditions in the molding and/or casting shop can be completely eliminated.

The above embodiments have been described in connection with molds, but the present invention can be effectively applied to other metallurgical formed articles such as hot top sleeves.

As above described, the present invention has a significant industrial advantage, because the working conditions for the casting operation using molds or hot top sleeves which are formed with use of organic binder can be consideraly improved.

What is claimed is:

1. A moldable composition for the production of forms, cores or shell molds which comprises sand, a synthetic resin binder and wood meal, said wood meal being scented and emitting a fragrance when heated and being present in an amount 0.5 to 5% based on the weight of the resin content of the composition.

2. The moldable composition according to claim 1 wherein said wood meal is that of aloes-wood or sandal-wood 3. The moldable composition according to claim 2 wherein said sand is casting sand and resin is a phenolic resin.

4. A method for producing a shell mold which comprises admixing casting sand, a phenolic resin and a scented wood meal from aloes-wood or sandal wood, said wood meal being present in an amount of 0.5 to 5% based on the amount of resin and a curing agent, and then forming the resultant mixture into a shell mold.

5. The shell mold produced by the method of claim 4.